United States Patent Office 2,780,607
Patented Feb. 5, 1957

2,780,607

SYNTHETIC BITUMEN COMPOSITIONS

George W. Rappleyea, Southport, N. C.

No Drawing. Application March 14, 1952,
Serial No. 276,695

26 Claims. (Cl. 260—9)

This invention relates to new synthetic bitumen compositions having excellent bonding and waterproofing properties, to new and improving paving and construction materials containing said new synthetic bitumen as bonding, waterproofing and stabilizing agents, and to processes for making same.

This is a continuation-in-part of application, Serial No. 179,653, filed August 15, 1950.

The object of this invention is to provide at very low cost, new synthetic bitumen compositions having superior bonding, waterproofing and stabilizing properties, and methods for making same.

Still another object is to provide improved paving materials containing the new synthetic binder of my invention.

Another object is to provide improved construction materials containing my new synthetic bitumen compositions, which are strong, erosion resistant, heat and sound insulating, moistureproof, fire resistant and vermin-proof, and which may be employed in a variety of forms, such as building blocks, weatherproof surface coatings, flooring and the like.

Still other objects and advantages of my invention will become apparent from the following detailed description.

I have found that fuel oils containing an appreciable asphalt content, when heated in admixture with a dry carbohydrate material in the presence of sulfur, sulfuric acid, lime or caustic, such as caustic soda or caustic potash, form a stable, insoluble, polymerized mass which has excellent adhesive and cohesive properties. It is somewhat similar to natural asphalt in appearance and in certain of its physical properties, as for example, cohesiveness and waterproofing characteristics. However, it differs from natural asphalt markedly in chemical composition.

Any asphalt base fuel oil may be used, including the cheapest grades of bunker type oils, as for example, "bunker C fuel oil." Many of these fuel oils normally contain from about 10 to 60% of asphalt, depending upon the source of the crude. If asphalt is lacking from the particular type of oil to be used, asphalt may be added in the desired quantities, as for example, about one pound of asphalt per gallon of oil, by melting the solid asphalt and then admixing it with the oil. For purposes of my invention, any available asphalt base fuel oil, namely, oils having asphalt contents from about 10% up to about 60% or higher, may be used, though generally for most purposes, about 40% gives optimum results. Although this is not essential, a fuel oil having an iodine number of about 40 and a specific gravity of about 0.95 or more, is particularly satisfactory for my purpose. Crude oil may also be employed if it is first heated to remove the more volatile constituents, such as gasoline.

The carbohydrate materials suitable for my purpose include the monosaccharides, dissacharides and polysaccharides such as starches, hemicelluloses, dextrins and the like. They may be employed in substantially pure state or in the form of by-products such as cane or beet molasses, wood "molasses," hemicellulose extract, waste sulfite liquor and the like. The use of such by-products is highly advantageous because of their considerably lower cost as compared with purified carbohydrates. It will be understood that the term "carbohydrate material" as employed in this specification and claims includes both substantially pure carbohydrates and by-products containing substantial amounts of carbohydrates.

The carbohydrate material must be dry. By-products such as molasses, wood sugar extracts, hemicellulose extracts and waste sulfite liquor which are normally in an aqueous medium, must be dehydrated to a dry solid or powder before use in my process. The presence of appreciable amounts of water results in an inferior product and, furthermore, causes extensive foaming which makes processing of the fuel oil-carbohydrate mixture very difficult. Partial dehydration, to a point where the material still retains sufficient moisture to possess fluid characteristics is not adequate for my purpose.

In carrying out my process the fuel oil is heated to a temperature of about 220° to 225° F. The dry carbohydrate material is then added to and thoroughly mixed with the hot fuel oil.

The amount of carbohydrate material used may vary considerably. For example, I have found that it may range up to about 75% by weight of the mixture, the remainder comprising the fuel oil and the catalytic agent. For most purposes about ½ to 1 lb. per gallon of fuel oil is adequate to give a hard product of high bonding strength and even less may be used depending on the desired characteristics such as hardness.

The mixture of fuel oil and carbohydrate is then permitted to cool to about 122° F. or less, and about 2 to 6%, preferably about 5%, of powdered sulfur is added as a catalytic agent to promote polymerization. In place of sulfur, concentrated sulfuric acid, as for example sulfuric acid having a specific gravity of about 1.86 may be used in an amount comprising about 1% of the total weight of the fuel oil and carbohydrate material.

After thorough admixture of the sulfur, or sulfuric acid, the temperature is raised to about 450° to 460° F. and maintained at the elevated temperature for a sufficient length of time to promote the desired polymerization or resinification. About one-half hour is generally sufficient. To obtain uniform polymerization the heating should be substantially uniform throughout the mixture. Underheating may result in incomplete resinification, while overheating may cause cracking of the asphalt in the fuel oil.

The rate at which the temperature is raised is an important factor in determining the hardness of the bitumen. Preferably, I raise the temperature of the fuel oil-carbohydrate mixture to about 450° F. gradually after addition of the catalyst since this results in a strong, hard bitumen, having a penetration number as low as about 20 which is preferable for most purposes. However, for some uses, a softer bitumen may be desired and this can be accomplished by increasing the temperature rapidly. In this way a bitumen having a penetration number as high as 200 to 300 may be obtained.

Lime, caustic soda or caustic potash may be employed as the catalytic agent instead of sulfur or sulfuric acid. In general, about 5 to 10%, and preferably about 5%, of these alkaline reagents give optimum results. The alkaline reagent should preferably be added in the form of the dry solid since an aqueous solution causes severe foaming. The amount of powdered carbohydrate material which can be polymerized with the fuel oil is reduced when caustic or lime is used, namely to about 55% by weight of the mixture. However, this proportion is well above normal requirements. Although the synthetic bitumen made with an alkaline catalyst is somewhat softer than that made with sulfur or acid, they possess the advantage of making up readily into aqueous emulsions. Aqueous emulsions are somewhat more advantageous for use as waterproofing and stabilizing agents than the non-emulsified synthetic bitumen in making certain construction materials, which will hereinafter be discussed.

Although this is not essential, I have found that the addition of a small amount of tall oil or lignin, preferably tall oil, at any point in the process prior to the final heating, but preferably accompanying the carbohydrate material, has a beneficial effect and results in a somewhat better product. About ½ to 1% of the tall oil or lignin is generally sufficient although more may be added if desired.

The reactions which take place in the mixture are not very clearly understood. However, to a considerable extent resinification appears to be due to the polymerization of the carbohydrates, which are aldehydes and ketones, with components such as phenol compounds present in the fuel oil. Other polymerization reactions undoubtedly occur as evidenced by the fact that the fuel oil substantially completely loses its identity. Unsaturated hydrocarbons are probably formed by the combined action of the heat and catalyst and then polymerize.

The synthetic bitumens of my invention are black in color, alkali resistant, of low acid number and insoluble in water, ethyl alcohol and acetone. When final heating of the mix to 450° F. is done gradually, the resulting bitumen is a hard, non-brittle solid having a penetration number as low as 20. If this heating is rapid, a softer bitumen is produced with a penetration number as high as 200 to 300. A softer bitumen may also be obtained by fluxing the hard synthetic bitumen product with additional fuel oil at a temperature of about 220° F. The penetration number is the distance in hundredths of a millimeter to which a needle, carrying a 50 gram weight, penetrates in 5 seconds at 77° F.

The bitumen is stable and may be stored indefinitely. It is an excellent bonding and waterproofing agent for mineral aggregates, such as stone, gravel, shale, limestone, clay, sand and the like. The bonded products are strong, hard, erosion-resistant, waterproof, immune to insect attack, fire-resistant and have excellent heat and sound insulating properties.

The following examples are illustrative of my process for making a synthetic bitumen, but, it will be understood are in no way limiting.

*Example 1*

An asphalt base fuel oil was heated to a temperature of about 220° F. Sucrose in the form of raw or brown sugar was added, in an amount equivalent to about one-half pound per gallon of fuel oil, together with about ½% of tall oil. The mixture was thoroughly agitated and cooled to 122° F. About 5% of powdered sulfur was added and thoroughly dispersed. The temperature of the mixture was then raised gradually with agitation to about 450 to 460° F. and this temperature was maintained for about 30 minutes. The resulting bitumen had a penetration number of 43.

*Example 2*

A synthetic bitumen was made according to the process of Example 1 except that one-half pound of cornstarch per gallon of fuel oil was used as the carbohydrate material. The resulting bitumen had a penetration number of 21.

*Example 3*

A synthetic bitumen was made according to the process of Example 1 except that one-half pound of dehydrated powdered blackstrap molasses per gallon of fuel oil was employed as the carbohydrate material. The resulting bitumen was a hard solid having a penetration number of about 27.

*Example 4*

A synthetic bitumen was made according to the process of Example 1 except that one-half pound of dehydrated, powdered beet sugar molasses per gallon of fuel oil was used as the carbohydrate material. The product had a penetration number of 38.

*Example 5*

Dehydrated wood sugars were employed as the carbohydrate material in this run. This product, sometimes referred to as wood "molasses" is produced by the acid hydrolysis of wood chips and consists largely of simple sugars, as for example, glucose and xylose. The synthetic bitumen, made according to the process of Example 1, had a penetration number of 29.

*Example 6*

The carbohydrate material used in this run comprised a powdered hemicellulose. Hemicellulose may be obtained from various plants. The particular material employed in this case was "Masonoid" which is produced by the Masonite Corporation. Masonoid is a dehydrated, powdered by-product resulting from the steam exploding of southern woods to obtain wood fibers and consists mainly of hexose and pentose polymers. The synthetic bitumen, made according to the process of Example 1, had a penetration number of 27.

*Example 7*

The carbohydrate material used in this run was waste sulfite liquor which had been dehydrated to a powder. The composition of waste sulfite liquor varies with different woods treated and different methods of cooking. However, all such liquors contain appreciable amounts of carbohydrates, including sugars such as galactose, xylose, arabinose and the like. Although the percentage of carbohydrate present in this by-product as compared with by-products such as molasses, hemicellulose extract, wood "molasses," etc. is considerably lower, the dried solids obtained from dehydration of the waste sulfite liquor produces a very satisfactory bituminous product. The synthetic bitumen, made according to the process of Example 1, had a penetration number of 27.

The presence of substantial amounts of mineral matter, as, for example, in carbohydrate by-products such as molasses, waste sulfite liquor, etc. does not adversely affect the bitumen, even in the case of soluble salts. The mineral particles are apparently surrounded by tenaciously clinging bitumen which is impervious to water and prevents leaching. The mineral matter tends to separate out of the mix prior to the final heating up to 450° F. and, if desired, though this is not essential, can be readily removed.

The average softening point of the synthetic bitumen made with the various carbohydrate materials is relatively high, being about 216° F. This is an important advantage when the bitumen is used as a coating or paving material.

My new synthetic bitumen can be made in concentrated form for shipment to areas where transportation costs are high but where fuel oils, such as "bunker C" fuel oil, are readily available, as for example, for use as ship fuel. In making the concentrate the quantity of fuel oil is reduced considerably below normal requirements, preferably to about one-tenth. The fractional proportion of fuel oil incorporated into the concentrate may be varied as desired, but from the point of view of transportation economy, the less used, the greater is the saving. The carbohydrate material and catalyst is added in the amounts requisite for the ultimate non-concentrated product. The carbohydrate-fuel oil mixture is heated to about 220° to 225° F. and then cooled to about 122° F. or less when the catalyst is added. Due to the greatly reduced proportion of fuel oil some of the carbohydrate material and catalyst may separate out so that the concentrate should be agitated before use to redisperse any separated solids. The admixture of a small amount of tall oil or lignin with the other components of the concentrate, though not essential, is advantageous as a stabilizing and dispersing agent.

When the concentrate arrives at its destination it is mixed with the requisite amount of asphaltic fuel oil to make the final non-concentrated product and heated gradually to and held at a temperature of about 450° to 460° F. for about one-half hour to accomplish the desired polymerization of unpolymerized carbohydrate material dispersed in the concentrate with the freshly added fuel oil. The advantages of the concentrate are clearly obvious from the fact that one fifty gallon barrel of concentrate is sufficient to make about two tons of the finished synthetic bitumen.

My new synthetic bitumen is particularly effective for use as a road paving material, since it adheres tenaciously to the individual pieces or particles of mineral aggregate and, after compaction fills in the interstices between mineral particles with a strong, continuous, highly cohesive mass, which holds the mineral aggregate firmly in place. The resulting pavement is firm, resists weathering and can withstand heavy traffic and heavy loads.

In preparing the paving material, both the aggregate and the binder should be heated, preferably to a temperature of about 275° F. The heated aggregate and binder are then thoroughly mixed in a suitable mixing device for about five minutes. The mixture is spread on the road and rolled and tamped in the usual manner. I have found that best results are obtained if the aggregate is not laid until about 18 to 24 hours after coating or until the initial tackiness of the binder coating is reduced to the point where it no longer sticks to the roller or tamper. For secondary roads where cost is a primary consideration and traffic is light, a binder having a carbohydrate material content of as low as 0.1 to 0.2 pound per gallon of fuel oil may be used.

Any suitable mineral aggregate may be used, as for example, broken stone, gravel, slag, shale, sand, etc. Preferably, some finely divided material such as sand is incorporated with the coarse aggregate. The proportions of binder to aggregate to a considerable extent are determined by the particle size of the aggregate, since the larger the surface area of the aggregate the larger the amount of coating or binder agent is required.

The following example is illustrative but is in no way limiting:

Example 8

125 pounds of a synthetic bitumen made as aforedescribed, with proportions of one-half pound of powdered molasses per gallon of Bunker C fuel oil having an asphalt content of 40% is heated to about 275° F. and then added to 1 ton of a mixture of broken stone and sand previously heated to about the same temperature. During mixing, 50 pounds of powdered limestone and 125 pounds of sand are added. After mixing for 5 minutes the mixture is stored for about 12 to 24 hours until tackiness is substantially gone and then spread on the road, tamped and rolled. The resulting pavement is hard, smooth, durable and withstands heavy loads without damage.

The thickness of the laid pavement should, of course, be varied depending upon the traffic load and the type of soil covered, particularly with respect to drainage, poorly drained soil requiring a thicker pavement.

Not only are pavements with my synthetic bitumen substantially similar or superior to asphalt pavements in strength and durability, but they are so inexpensive as to make them economically feasible for use on secondary and other roads where asphalt pavements would ordinarily be prohibitive in cost.

The polymerized carbohydrate-fuel oil compositions may also be used as prime or seal coats before or after paving. For these purposes it is preferable to employ either aqueous emulsions or a cut-back. A cut-back of any desired consistency may be formed by thinning and dissolving the bitumen in a solvent such as gasoline or by fluxing the bitumen with added fuel oil.

A dirt road carrying a light traffic load may be given a strong, hard, water-resistant surface by mixing the soil to a depth of about 1 to 2 inches with the synthetic bitumen in molten state or with an aqueous emulsion and then compacting.

An aqueous emulsion is readily made with carbohydrate-fuel oil compositions polymerized in the presence of lime, caustic soda or caustic potash by adding water to the synthetic bitumen and heating to the boiling point. The alkaline catalyst employed in the resinification process is sufficient to accomplish emulsification. The proportions of the synthetic bitumen and water may, of course, be varied according to the specific conditions of use. In general, I have found a ratio of about 800 parts of the resinified composition to about 560 parts of water to be particularly satisfactory. An emulsion made in this manner is of the fast breaking type and is especially suitable for use as a seal coat for pavements.

When the synthetic bitumen emulsion is to be used as a bonding, or waterproofing agent in admixture with mineral particles such as sand or clay, it should be of the slow breaking type and must, therefore, be treated with an additional emulsifying or stabilizing agent. Any of the well known emulsifying agents which are used in making natural asphalt emulsions may be employed such as glue, casein, dried skim milk and dried animal blood. Particularly effective for my purpose are lignin, a byproduct of papermaking, or a pine resin, such as "Vinsol" (Hercules Powder Company). In making the stabilized or slow breaking emulsion, the stabilizing agent is added to the hot synthetic bitumen and water mixture, generally in amounts of about 1 to 3%. A good stable emulsion may be made by adding an aqueous mixture of pine resin and caustic to a boiling aqueous emulsion of the synthetic bitumen containing a small amount of ligin, the formulation having the following proportions: bitumen 57.1%, lignin 0.2%, resin 2.3%, caustic 0.4% and water 40%. With other emulsifying agents the added caustic may be dispensed with.

Aqueous emulsions can also be made from the sulfur or acid catalyzed bitumen. Although they are somewhat more difficult to make than emulsions from bitumen prepared with an alkaline catalyst, the former have the advantage of being more stable.

A highly stable aqueous emulsion can be prepared by pouring the hot, molten, sulfur or acid catalyzed bitumen into a hot aqueous mixture containing an alkali such as caustic soda, tall oil and a clay such as bentonite or vol clay.

Example 9

3 ounces of caustic soda are dissolved in a mixture consisting of 3½ pints of water and 1½ pints of tall oil. To this is added 5 ounces of bentonite or vol clay in 3 pints of water. The resulting mixture is heated to about 150° F. and to it is added 13 pounds of sulfur or acid catalyzed bitumen in hot molten state. The resulting emulsion is slow breaking and stable for several weeks.

I have found that my new synthetic bitumen compositions are exceedingly effective as waterproofing and stabilizing agents for clay and clay and sand mixtures. The treated clay mixtures may be employed for making a large variety of strong and durable construction materials. Cut-backs of the synthetic bitumen compositions or aqueous emulsions may be used for these purposes, preferably the latter, since they result in somewhat stronger products. The non-emulsified synthetic bitumens possess strong bonding properties, but reduce the powerful cohesive forces normally exerted by the clay particles. When the synthetic bitumen is used in finely divided emulsion form, it acts as a stabilizing and waterproofing agent rather than as a bonding agent and does not adversely affect the strong cohesive forces of the clay.

For centuries sun-baked clay or adobe has been employed as a building material in many arid regions. However, since it is rapidly eroded and washed away by rain, despite its great strength and economy, adobe bricks could not be used in regions having appreciable rainfall. To overcome this shortcoming, asphalt emulsions have been incorporated into the adobe to make the bricks water-resistant. However, asphalt is relatively expensive and therefore increases costs unduly. I have found that my new synthetic bitumen compositions which are considerably less costly than natural asphalt are exceedingly effective for stabilizing and waterproofing adobe soils.

The adobe soil must contain sufficient clay to bind strongly when dried after admixture with water. Since heavy clay soils, though highly cohesive and strong when dry, tend to crack or fissure, while the presence of too high a proportion of sand decreases strength and resistance to erosion, a proper balance of these components is necessary. This can readily be determined on the spot by preliminary testing of the soil, as for example, by molding into a ball a sample of the soil made into a mud by wetting. If, after drying the ball is easily crushed, it contains an excessive proportion of sand. If it is not readily crushed but cracks during drying it is advisable to add additional sand, straw, or pulp. The soil should be thoroughly screened to remove lumps or stones.

The soil after mixture with sufficient water to give it the consistency of soft mud is thoroughly mixed with the synthetic bitumen in the form of a cut-back or a slow breaking aqueous emulsion, preferably the latter. The amount of the synthetic bitumen used varies somewhat with the particular soil used. In general, from about 4 to 7% by weight is sufficient, though more or less may be used depending upon specific conditions. The optimum amount for use with a specific soil may be readily determined by molding test bricks containing varying amounts of the bitumen.

The treated soil mixtures are molded in suitable forms of the desired size and then permitted to dry and cure either in the sun or in slow ovens at temperatures of about 150° to 200° F. The resulting bricks are strong, hard and crack-resistant. They are considerably less pervious to water than concrete. For example, after immersion in water for three months they absorb only about 2% of moisture with no loss of strength, while concrete absorbs about 8%. They have excellent heat and sound insulating properties and are vermin and insect proof and fire resistant.

The addition of a fibrous material to a mixture of wet clay and the synthetic bitumen results in a plastic construction material of great versatility. Any fine clay soil may be used. It should be well washed with water which is decanted or drained off until the remaining wet clay weighs approximately 18 pounds per gallon.

If a non-emulsified synthetic bitumen is used, it should desirably be in the form of a fluid cut-back. Best results are obtained with a slow breaking aqueous emulsion. The concentration of the synthetic bitumen in the emulsion may vary and I have found about 800 parts in 560 parts of water very satisfactory.

Any suitable fibrous material may be used, as for example, wood fiber, sawdust or paper fiber obtained by macerating or grinding paper or cardboard through a ⅜ inch screen. If an especially strong product is desired, cotton linters, jute, hemp or hair may be substituted in whole or in part for the wood or paper fiber. The addition of up to about 5% of cotton fibers, for example, will give increased strength without appreciably increasing costs. For ordinary purposes, paper fiber alone provides adequate strength. For increased hardness, fire resistance and insulating properties, asbestos fiber may be used either in addition to or in place of the wood or paper fiber.

The proportions of the various ingredients may be varied considerably depending upon the ultimate use and desired properties. For example, for a mixture comprising about 12 gallons of wet clay and about 12 pounds of ground paper, the amount of bitumen composition added may vary from about 12 to 24 quarts depending upon such factors as the desired hardness and insulating properties and the like. The amount of fibrous material also varies depending upon the particular fiber or mixture of fibers used and the desired toughness and resiliency of the resulting construction material. Increasing the proportion of fiber in general makes a tougher, more resilient composition.

To enhance the fire-resistant properties of the construction material and to prevent excessive hardening after aging, a small amount of sodium chloride may be added to the composition, although this is not essential. A small amount of bentonite or vol clay also helps to increase resiliency. For example 3 ounces of a mixture comprising 2 ounces of sodium chloride and 1 ounce of an insoluble earth or clay such as bentonite or vol clay are mixed with 1 gallon of water until the salt dissolves. The resulting mixture is added to the synthetic bitumen-clay-fiber composition in the proportion of about 1 pint to each 30 gallons of the wet bitumen mix.

The wet clay, synthetic bitumen and fiber must be thoroughly mixed by hand or in a suitable mixing device until the various components are uniformly and intimately dispersed. The mixing may be carried out at ordinary or at elevated temperature. Hot mixing is necessary only if a bitumen cut-back or an aqueous emulsion is not available and the solid bitumen must be used directly. If mixed hot, the wet clay is heated to boiling and then the melted synthetic bitumen and fiber are added. The temperature during mixing should desirably be maintained at about 212° F.

The mix may be colored as desired by adding a thin paste of pigment and water.

The resulting synthetic bitumen-clay-fiber mixture is a plastic composition of a paste-like consistency which is sufficiently fluid to be sprayed or troweled. When stored in closed containers it retains its fluid consistency. Upon drying it sets into a solid mass of great strength, hardness and durability which becomes progressively harder during aging for several weeks and which does not soften even under the action of a blow torch. Compositions made with aqueous emulsions are somewhat stronger than those made with the straight bitumen or cut-back.

The clay-fiber-synthetic bitumen compositions can be used as the structural material for building strong, weatherproof houses, including exterior and interior walls, roof and floors. In constructing walls and roof the compositions may be troweled or sprayed to the desired thickness onto wire mesh screening tacked onto black building paper or tar paper attached to a wooden framework.

The applied composition can be given a variety of finishes. Before it sets it can be troweled and lined off to assume the appearance of stone, or it can be rolled to give a smooth surface. It can be given a stucco finish by spraying over it a white or colored cement. Preferably, the cement is applied before the synthetic bitumen composition is dried and set, since the latter will then supply moisture to the cement so that the cement cures slowly without cracking. Oil paints can also be applied, though preferably an oil-proof base coating such as aluminum paint should be used first.

A strong durable floor which is soundproof, moistureproof, heat insulating and shock absorbent may be made by troweling the synthetic bitumen-clay-fiber compositions on a cement, conrete, wood or well packed earth base and then rolling or otherwise smoothing the surface. A tile effect can be obtained by lining off the composition while still wet and plastic. The floors are resilient and, therefore, increase walking comfort. Because of their high heat and sound insulating properties they are warm to the touch and sound absorbent.

The synthetic bitumen-clay-fiber compositions may be made into tiling by spraying or troweling on to canvas or paper. They also provide excellent weather-proof surface coatings when sprayed over concrete, cement, adobe walls or the like.

Houses built with the synthetic bitumen construction materials, in addition to being weather-resistant, moisture-proof, heat and sound insulating, vermin-proof, strong and durable, are exceedingly inexpensive, costing but a few cents per cubic foot.

Although this invention has been described with reference to illustrative embodiments thereof, it will be apparent to those skilled in the art that it may be embodied in other forms but within the scope of the appended claims.

I claim:

1. A composition comprising a heat polymerized product of a mixture of an asphaltic fuel oil containing about 10 to 60% asphalt, a substantially dry, solid carbohydrate material in amount up to about 75% by weight, said polymerization having been accomplished in the presence of a catalytic agent selected from the group consisting of sulfur, sulfuric acid, lime, caustic soda and caustic potash.

2. A composition comprising a heat polymerized product of a mixture of an asphaltic fuel oil containing about 10 to 60% asphalt and substantially dry dextrin in amount up to about 75% by weight, said polymerization having been accomplished in the presence of sulfur.

3. A composition comprising a heat polymerized product of a mixture of an asphaltic fuel oil containing about 10 to 60% asphalt, a substantially dry, solid carbohydrate material selected from the group consisting of monosaccharides, disaccharides, starches, hemicellulose and dextrins in amount up to about 75% by weight, said polymerization having been accomplished in the presence of a catalytic agent selected from the group consisting of sulfur, sulfuric acid, lime, caustic soda and caustic potash.

4. A composition comprising a heat polymerized product of an asphaltic fuel oil containing about 10 to 60% asphalt and substantially dry hemicellulose in amount up to about 75% by weight, said polymerization having been accomplished in the presence of sulfur.

5. A composition comprising a heat polymerized product of an asphaltic fuel oil containing about 10 to 60% asphalt and substantially dry mono-saccharide in amount up to about 75% by weight, said polymerization having been accomplished in the presence of sulfur.

6. A composition comprising a heat polymerized product of an asphaltic fuel oil containing about 10 to 60% asphalt and substantially dry disaccharide in amount up to about 75% by weight, said polymerization having been accomplished in the presence of sulfur.

7. A composition comprising a heat polymerized product of an asphaltic fuel oil containing about 10 to 60% asphalt and substantially dry starch in amount up to about 75% by weight, said polymerization having been accomplished in the presence of sulfur.

8. A process for making a synthetic bitumen comprising admixing a substantially dry, solid carbohydrate material in an amount up to about 75% by weight and a catalytic agent selected from the group consisting of sulfur, sulfuric acid, lime, caustic soda and caustic potash, with an asphaltic fuel oil containing about 10 to 60% asphalt and heating the mixture to and maintaining it at a temperature of about 450° to 460° F. until said mixture is substantially polymerized.

9. A process for making a synthetic bitumen comprising heating an asphaltic fuel oil containing about 10 to 60% asphalt to a temperature of about 220° to 225° F., admixing a substantially dry, solid carbohydrate material in an amount up to about 75% by weight with said fuel oil, cooling to a maximum temperature of about 122° F., adding a catalytic agent selected from the group consisting of sulfur, sulfuric acid, lime, caustic soda and caustic potash, heating the resulting mixture to a temperature of about 450° to 460° F. and maintaining said temperature until said mixture is substantially polymerized.

10. A process for making a synthetic bitumen comprising heating a mixture of an asphaltic fuel oil containing about 10 to 60% asphalt and a substantially dry, solid carbohydrate material selected from the group consisting of monosaccharides, disaccharides, starches, hemicelluloses and dextrins, in an amount up to about 75% by weight, in the presence of sulfur, to a temperature of about 450° to 460° F. and maintaining said temperature until said mixture is substantially polymerized.

11. A process for making a synthetic bitumen comprising heating an asphaltic fuel oil containing about 10 to 60% asphalt to a temperature of about 220° to 225° F., admixing a substantially dry, solid carbohydrate material in an amount comprising up to about 75% by weight of the total composition with said fuel oil, cooling to a maximum temperature of about 122° F., adding about 5% of sulfur, heating the resulting mixture to a temperature of about 450° to 460° F. and maintaining said temperature until said mixture is substantially polymerized.

12. A process for making a synthetic bitumen comprising heating an asphaltic fuel oil containing about 10 to 60% asphalt to a temperature of about 220° to 225° F., admixing a substantially dry, solid carbohydrate material in an amount comprising about ½ to 1 lb. per gallon of fuel oil with said fuel oil, adding about 5% of sulfur, heating the resulting mixture to a temperature of about 450° to 460° F. and maintaining said temperature until said mixture is substantially polymerized.

13. A process for making a synthetic bitumen comprising heating an asphaltic fuel oil containing about 10 to 60% asphalt to a temperature of about 220° to 225° F., admixing powdered dehydrated molasses in an amount up to about 75% by weight with said fuel oil, cooling to a maximum temperature of about 122° F., adding sulfur, heating the resulting mixture to a temperature of about 450° to 460° F. and maintaining said temperature until the mixture is substantially polymerized.

14. A process for making a synthetic bitumen comprising heating an asphaltic fuel oil containing about 10 to 60% asphalt to a temperature of about 220° to 225° F., admixing substantially dry hemicellulose in an amount up to about 75% by weight with said fuel oil, cooling to a maximum temperature of about 122° F., adding sulfur, heating the resulting mixture to a temperature of about 450° to 460° F. and maintaining said temperature until the mixture is substantially polymerized.

15. A process for making a synthetic bitumen comprising heating an asphaltic fuel oil containing about 10 to 60% asphalt to a temperature of about 220° to 225° F., admixing substantially dry mono-saccharides in an amount up to about 75% by weight with said fuel oil, cooling to a maximum temperature of about 122° F., adding sulfur, heating the resulting mixture to a temperature of about 450° to 460° F. and maintaining said temperature until the mixture is substantially polymerized.

16. A process for making a synthetic bitumen comprising heating an asphaltic fuel oil containing about 10 to 60% asphalt to a temperature of about 220° to 225°, admixing substantially dry disaccharide in an amount up to about 75% by weight with said fuel oil, cooling to a maximum temperature of about 122° F., adding sulfur, heating the resulting mixture to a temperature of about 450° to 460° F. and maintaining said temperature until the mixture is substantially polymerized.

17. A process for making a synthetic bitumen comprising heating an asphaltic fuel oil containing about 10 to 60% asphalt to a temperature of about 220° to 225° F., admixing substantially dry starch in an amount up to about 75% by weight with said fuel oil, cooling to a maximum temperature of about 122° F., adding sulfur, heating the resulting mixture to a temperature of about 450° to 460° F. and maintaining said temperature until the mixture is substantially polymerized.

18. A composition comprising an aqueous emulsion of the polymerized product defined in claim 1.

19. A process for making paving material comprising coating mineral aggregate with the polymerized product defined in claim 1.

20. Construction material comprising wet clay soil admixed with an aqueous emulsion of the polymerized product defined in claim 1.

21. Construction material comprising clay, fibrous material and the polymerized product defined in claim 1.

22. Construction material comprising clay, paper fiber and the polymerized product defined in claim 1.

23. A process for making construction materials comprising intimately admixing wet clay and fibrous material with an aqueous emulsion of the polymerized product defined in claim 1.

24. A composition comprising a heat polymerized product of a mixture comprising fuel oil containing about 10 to 60% asphalt and powdered, dehydrated molasses in an amount up to about 75% by weight, said polymerization having been accomplished in the presence of sulfur.

25. A process for making a synthetic bitumen comprising admixing a substantially dry, solid carbohydrate material in an amount up to about 75% by weight and a catalytic agent selected from the group consisting of sulfur, sulfuric acid, lime, caustic soda and caustic potash, with an asphaltic fuel oil containing about 10 to 60% asphalt, and heating the mixture to and maintaining it at a temperature at which said mixture is substantially polymerized.

26. A process for making a synthetic bitumen comprising admixing a substantially dry, solid carbohydrate in an amount up to about 75% by weight and sulfur with an asphaltic fuel oil containing about 10 to 60% asphalt, and heating the mixture to and maintaining it at a temperature at which said mixture is substantially polymerized.

References Cited in the file of this patent

Sen: J. Sci. Tech., India, vol. 2, pages 8–24 (1936), Chem. Abstracts, vol. 32 page 1423 (1938).

Sen: Proc. Sug. Tech. Assoc., India, vol. 5, pages 289–302 (1936); Chem. Abstracts, vol. 32, pages 4302–4303.

Sen: J. Sci. Tech., India, vol. 3, pages 27–34 (1937); Chem. Abstracts, vol. 32, page 8735 (1938).

Sen: J. Sci. Tech., India, vol. 4, pages 65–72 (1938); Chem. Abstracts, vol. 34, page 2562 (1940).

Sen: Proc. Sugar Tech. Assoc., India (1940), Pt. I, pages 315–325; Chem. Abstracts vol. 35, pages 5667–5668 (1941).

Srivastava: Indian Trade J., vol. 128, pages 734–735 (1938); Chem. Abstracts, vol. 32, page 4747 (1938).